United States Patent [19]

Van Tiel

[11] Patent Number: 5,442,262
[45] Date of Patent: Aug. 15, 1995

[54] DISPLAY DEVICE INCLUDING A FIELD DISTORTION CORRECTION CIRCUIT, AND FIELD DISTORTION CORRECTION CIRCUIT

[75] Inventor: Antonius H. Van Tiel, Eindhoven, Netherlands

[73] Assignee: U.S. Philips Corporation, New York, N.Y.

[21] Appl. No.: 203,966

[22] Filed: Mar. 1, 1994

[30] Foreign Application Priority Data

Mar. 4, 1993 [EP] European Pat. Off. ............ 93200630

[51] Int. Cl.⁶ ........................ G09G 1/04; H01J 29/70
[52] U.S. Cl. ....................... 315/371; 315/395
[58] Field of Search ............... 315/371, 395, 370, 391, 315/408

[56] References Cited

U.S. PATENT DOCUMENTS

| | | | |
|---|---|---|---|
| 3,676,733 | 7/1972 | Eulenberg et al. | 315/27 |
| 3,949,269 | 4/1976 | Wheeler | 315/371 |
| 4,041,354 | 8/1977 | Haferl | 315/371 |
| 4,118,656 | 10/1978 | Dietz | 315/371 |

FOREIGN PATENT DOCUMENTS

| | | | |
|---|---|---|---|
| 0201336 | 5/1985 | European Pat. Off. | H04N 3/327 |
| 8600170 | 1/1986 | WIPO | H01J 29/56 |

Primary Examiner—Gregory C. Issing
Attorney, Agent, or Firm—Edward W. Goodman

[57] ABSTRACT

When, for example, horizontal lines are displayed on a display screen of a display device, they may exhibit a field distortion, predominantly in the form of gullwing distortion which becomes manifest as a sinewave-shaped line instead of the horizontal line to be displayed. To correct this field distortion, a correction is generated by a field distortion correction circuit and a resonant circuit, dependent on the location on the display screen, which correction is added to the field deflection current so that the picture to be displayed is corrected for this error.

6 Claims, 3 Drawing Sheets

DISPLAY DEVICE INCLUDING A FIELD DISTORTION CORRECTION CIRCUIT, AND FIELD DISTORTION CORRECTION CIRCUIT

BACKGROUND OF THE INVENTION

1. Field of the Invention

The invention relates to a display device comprising a display tube with a display screen, a deflection unit for deflecting at least one electron beam generated in the display tube, said deflection unit comprising at least a line deflection coil and a field deflection coil, and a field distortion correction circuit coupled to the deflection unit for correcting the field deflection.

2. Description of the Related Art

The invention also relates to a field distortion correction circuit.

A display device of the type described above is known from European Patent Application EP-A 201336 corresponding to U.S. Pat. No. 4,642,530. The display device described in this Patent Application comprises a field distortion correction circuit using a non-linear reactor, for example, a saturable transformer, in which a first modulation current, having a frequency which is a harmonic of the line frequency, is applied to an input winding of the reactor/transformer. This first modulation current is modulated by means of a signal at the field frequency. This makes it possible to correct pincushion distortion and/or gullwing distortion.

A drawback of this known display device including a field distortion correction circuit is that the reactor (saturable induction)/transformer used therein is expensive and that it is a large, complicated component having many branches, while the reactor does not have a satisfactory temperature stability. A further drawback of the reactor/transductor is that this element has a very detrimental influence on other elements of the display device.

SUMMARY OF THE INVENTION

It is an object of the invention to provide a display device which does not have the above-mentioned drawbacks. To this end, a display device according to the invention is characterized in that the field distortion correction circuit comprises a resonant circuit with a series arrangement of an inductance and a capacitor, and a bidirectionally conducting line frequency-controlled switch, the inductance being coupled to the field deflection coil and the field distortion correction circuit being adapted to receive an uncorrected field deflection current and line deflection current at a first and a second input, respectively, and to supply a corrected field deflection current at an output.

By controlling the field distortion correction circuit by means of a bidirectionally conducting switch, it is ensured that the reactor/transductor, required in the known display device, can be dispensed with so that a simpler and more accurate correction of the field distortion (pincushion) and gullwing distortion can be obtained.

To modulate the field deflection current with the correction generated in the field distortion correction circuit, the field distortion correction circuit of a second embodiment includes a second inductance which is coupled to the field deflection coil.

An embodiment of a display device according to the invention is characterized in that the field distortion correction circuit includes a series arrangement of a resistor and a third inductance for charging the resonant circuit, the junction point of the resistor and the third inductance being coupled to the second inductance.

An embodiment of a display device according to the invention is characterized in that the field distortion correction circuit includes at least two anti-parallel diodes arranged parallel to the resistor. The generated correction at the upper and lower sides of the display screen is then limited so as to avoid overcompensation of the picture.

A further embodiment of a display device according to the invention is characterized in that the field distortion correction circuit includes an extra resonant circuit which is arranged parallel to the series arrangement of the inductance and the capacitor. To correct higher harmonic distortions, the field distortion correction circuit may be provided with the extra resonant circuit, this extra resonant circuit being adjusted for these higher distortions to be corrected.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
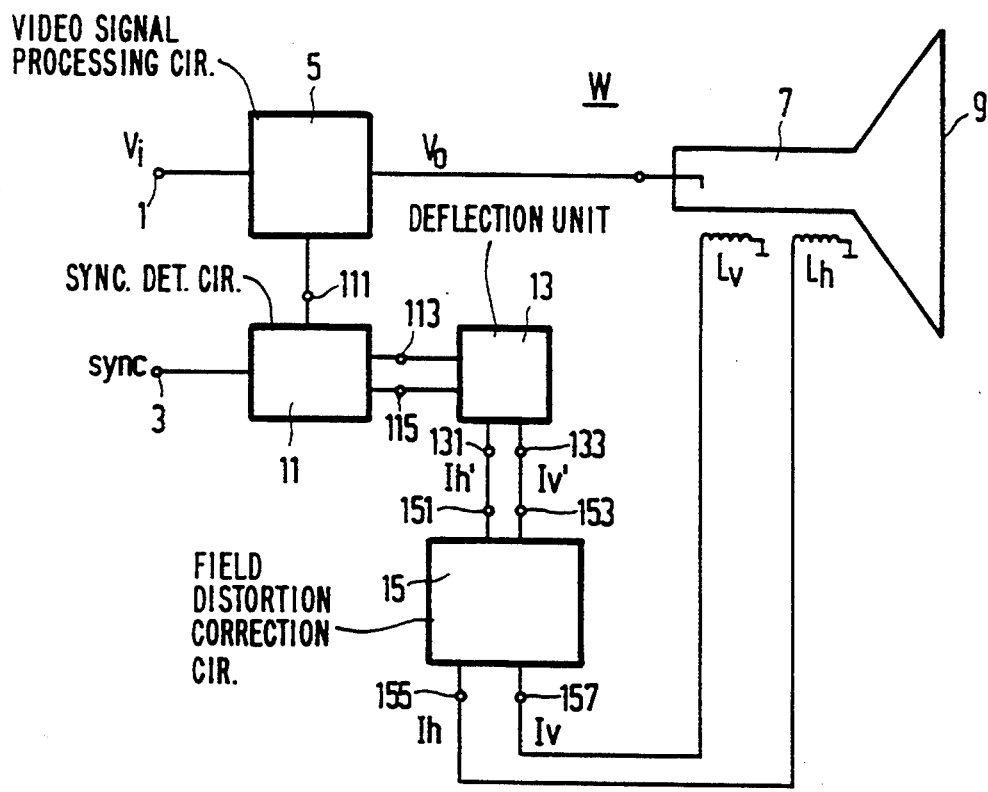
FIG. 1 shows a first embodiment of a display device according to the invention.

FIG. 1 shows a display device W according to the invention. An input 1 of the display device receives a video signal Vi. This input 1 is coupled to a video signal processing circuit 5 which applies the processed video signal Vo to a display tube 7. Under the control of a line deflection coil Lh and a field deflection coil Lv, electron beam currents generated in the display tube 7 are deflected towards the relevant locations on a display screen 9 of the display tube 7. An input 3 of the display device also receives a synchronizing signal synch, this input 3 being coupled to a synchronizing detection circuit 11. An output 111 of the synchronizing detection circuit 11 applies a control signal to the video signal processing circuit 5. Outputs 113 and 115 of the synchronizing detection circuit 11 apply control signals to a deflection unit 13 for synchronizing the deflection unit 13 with the video signal processing circuit 5. Outputs 131 and 133 of the deflection unit 13 apply a line deflection current Ih' and a field deflection current Iv' to inputs 151 and 153, respectively, of a field distortion correction circuit 15. Outputs 155 and 157 of the field distortion correction circuit 15 apply the corrected line and field deflection currents Ih and Iv to the line deflection coil Lh and the field deflection coil Lv.

With the aid of the line and field deflection currents, the field distortion correction circuit 15 corrects the field deflection current so as to correct the gullwing distortion. Without correction, a horizontal line is displayed on the display screen 9 as a sinewave. The errors increase from the center towards the top and the bottom of the display screen, but above and below the center the distortion has an opposite sign (see FIG. 4). The field distortion correction circuit 15 is shown in greater detail in FIG. 2.

Figure 2:
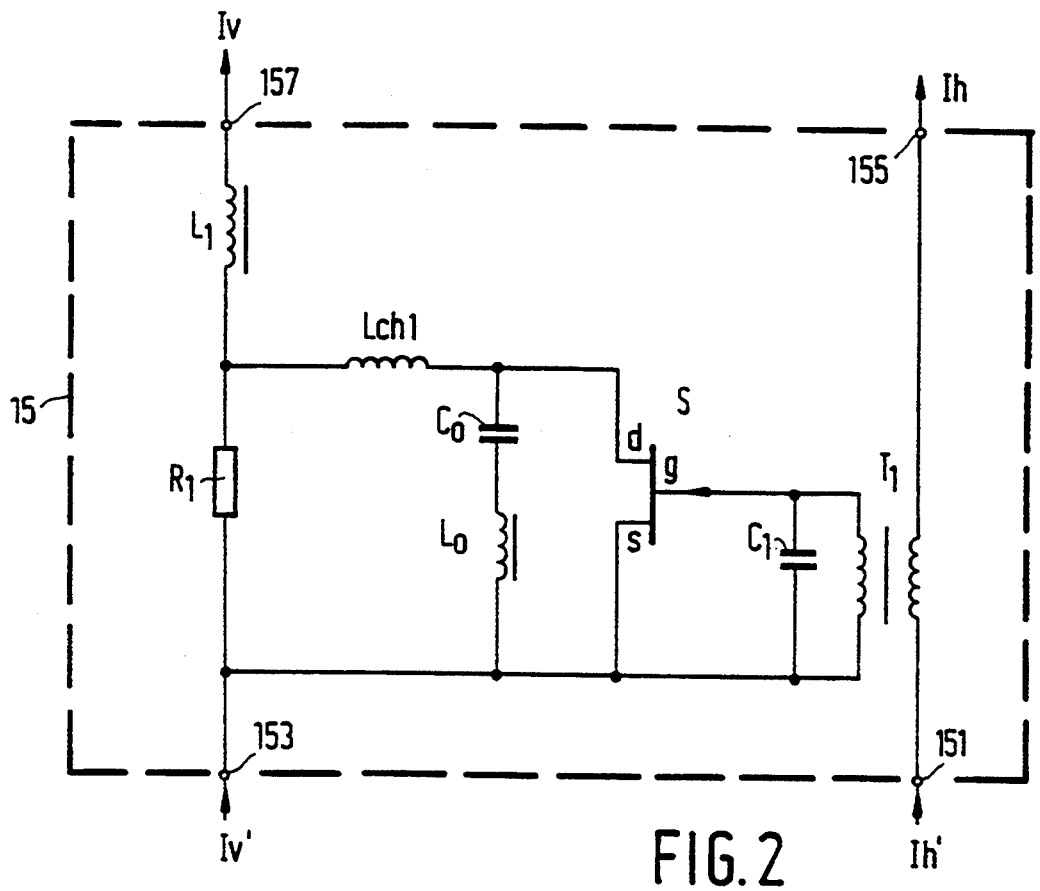
FIG. 2 shows a (second) embodiment of a field distortion correction circuit.

FIG. 2 shows an embodiment of a field distortion correction circuit 15. The input 151 receives the line deflection current Ih' from the deflection unit 13, the deflection current is applied to the output 155 in this embodiment from a winding of a transformer T1. A secondary winding of the transformer T1 is coupled across a capacitor C1. One side of the capacitor C1 is connected to a control input g of a j-FET operating as a bidirectional switch S. Instead of a j-FET, any other bidirectional semiconductor element operating as a switch may be chosen.

A series arrangement of a second capacitor Co and an inductance Lo is arranged across the switch S, the source s of the switch being connected to the side of the capacitor C1 which is not connected to the control input g. The source s is also connected to the input 153 to which also a resistor R1 is connected. The other side of the resistor is connected to the drain d of the switch S via a second inductance Lch1.

The junction point of the resistor R1 and the inductance Lch1 is connected to the output terminal 157 via a third inductance L1. The inductance Lo and the inductance L1 are inductively coupled. It is, for example, possible to form the inductances Lo and L1 as primary and secondary windings of an (extra) transformer, or as an autotransformer, or as a coil wound in one sense.

The field distortion correction circuit 15 operates as follows. The switch S is rendered conducting at the line frequency by means of the transformer T1 and the capacitor C1. When the switch S is closed, the capacitor Co and the inductance Lo constitute a resonant circuit which adds the resonance voltage/current to the field deflection current Iv' by means of the inductance Lo (and the inductance L1) so that the modulated field deflection current Iv is applied to the field deflection coil.

The resonant circuit has a resonance frequency of, for example, twice the line frequency for correcting the gullwing distortion. The resistor R1, generating a voltage dependent on the field deflection current Iv', is used for feeding the resonant circuit. This voltage is applied to the capacitor Co via the extra inductance Lch1 when the switch S does not conduct (i.e., during the line retrace periods). Consequently, the capacitor Co is charged every line retrace period with a voltage whose value and polarity are dependent on the field deflection current so that the correction, (by means of the resonant circuit) is also dependent (as desired) on the field deflection current, i.e., there is no correction in the center of the display screen and an increasing (opposite) correction towards the top and the bottom. It is essential that the switch S is a bidirectional switch, because the control is effected from the line deflection current which may be either positive or negative.

Figure 3:
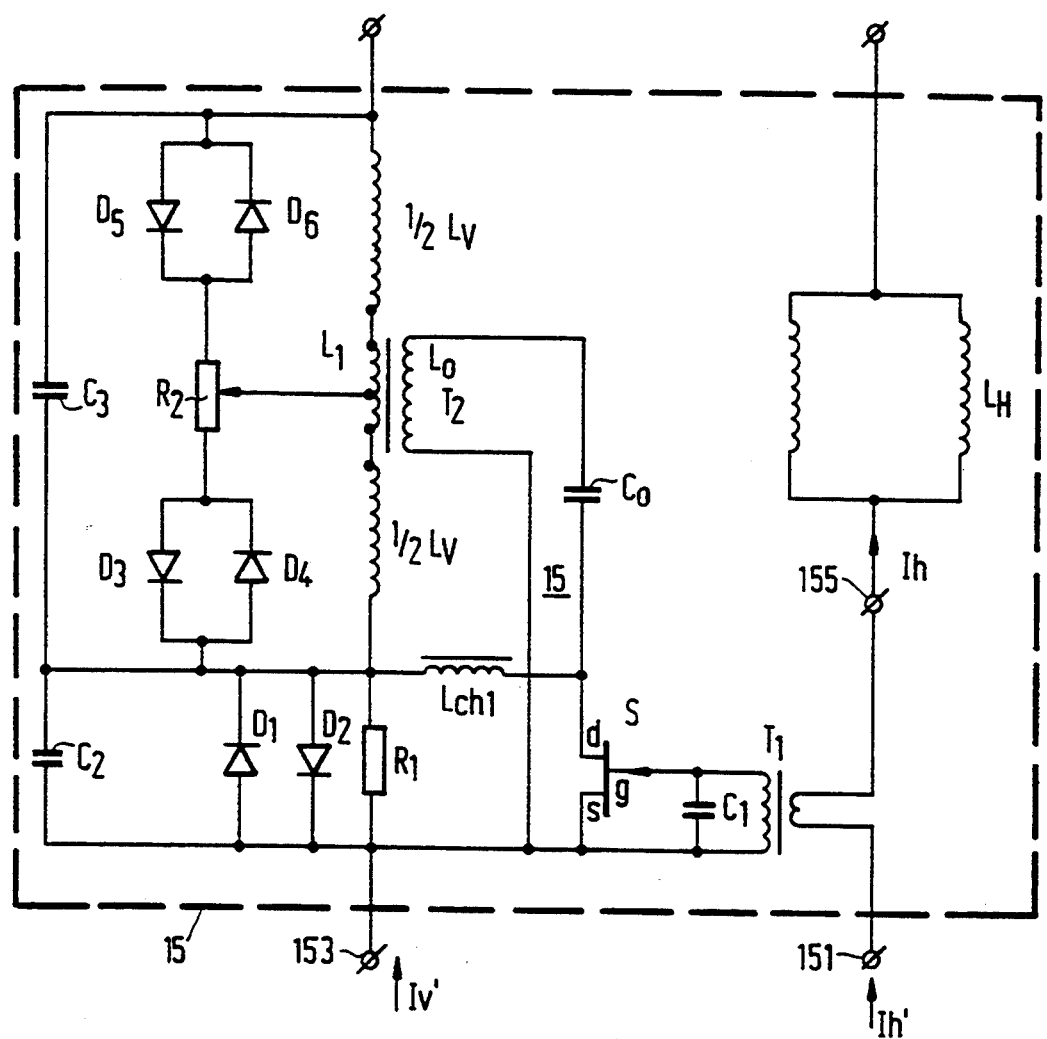
FIG. 3 shows an embodiment of a field distortion correction circuit according to the invention.

FIG. 3 shows an embodiment of a field deflection distortion correction circuit 15 with the line and field deflection coils, in which the field deflection coil Lv consists of two halves. This renders it necessary to apply the gullwing correction in between the two halves to the field deflection circuit by means of a transformer T2 (constituted, for example, by the two inductances Lo and L1, see FIG. 2).

The inductance Lo, the capacitor Co, the switch S, the control circuit (comprising the capacitor C1 and the transformer T1) and the load circuit (comprising the inductance Lch1 and the resistor R1) operate in a manner corresponding to that of the element shown in FIG. 2. Diodes D1 and D2 ensure that the gullwing correction generated by the field distortion correction circuit 15 is limited towards the upper and lower sides of the display screen 9 so as to prevent these parts of the display screen from being overcompensated. The gullwing correction is limited by limiting the voltage across the resistor R1 with these anti-parallel arranged diodes. A further circuit of twice two anti-parallel diodes D3, D4 and D5, D6 and a resistor R2 constitutes an adjusting circuit for adjusting the center of the two field deflection coil halves in known manner. Capacitors C2 and C3 provide a capacitive division between the field distortion correction circuit (C2) and the field deflection coil halves (C3).

Figure 4:
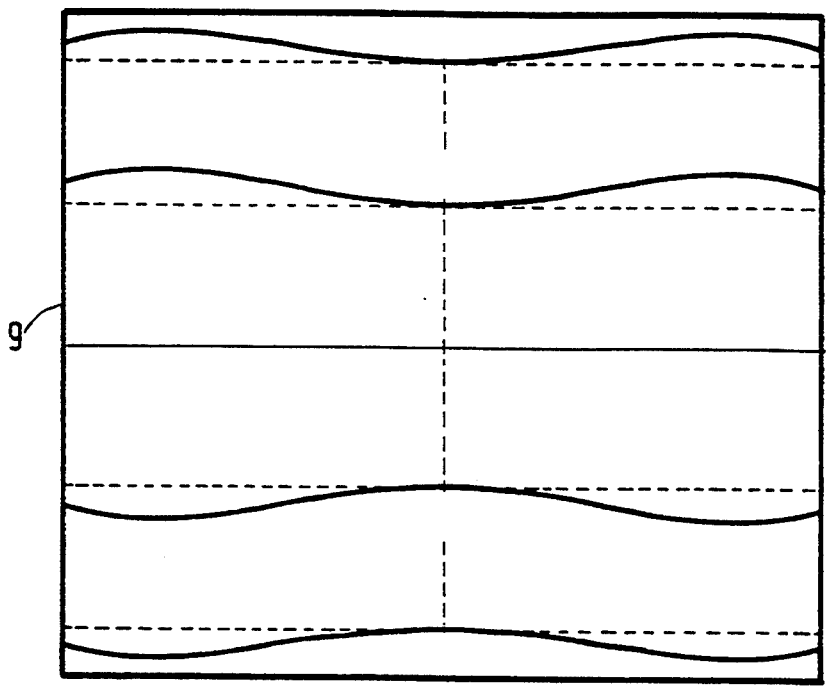
FIG. 4 shows examples of gulling distortion on a display screen.

FIG. 4 shows a display screen 9 with a plurality of horizontal lines exhibiting the gullwing distortion (instead of straight lines, the lines are sinewave-shaped). From the center (substantially no distortion), the distortion increases towards the top and the bottom, while the distortion is more or less symmetrical with respect to the centerline. The increase of the distortion decreases at the upper side and the lower side of the display screen so that the diodes D1 and D2 are required to limit the correction.

Figure 5:
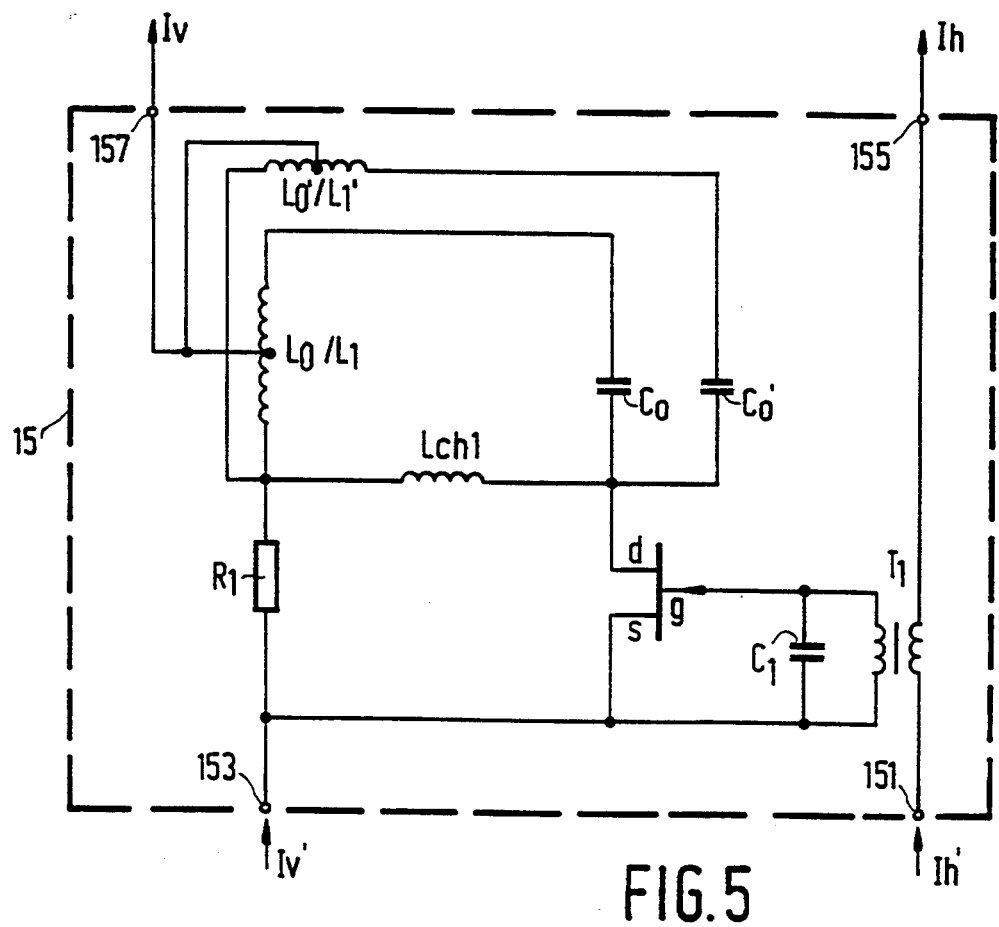
FIG. 5 shows an embodiment of a field distortion correction circuit according to the invention.

FIG. 5 shows an embodiment of a field distortion correction circuit 15' which, in addition to the elements shown in FIG. 2, comprises an extra resonant circuit with an inductance Lo'/LI' and a capacitor Co'. The inductance Lo'/LI' (as well as the inductance(s) Lo/L1) is shown in the form of a coil wound in one sense and having a tap which is coupled to the output 157. This extra resonant circuit may be adjusted, for example, at a higher frequency than the resonant circuit comprising the inductance Lo and the capacitor Co. Consequently, for example, a higher harmonic of the field distortion can be compensated for.

It will be evident to those skilled in the art that the field distortion correction circuit can be adapted in all kinds of ways without departing from the scope of the appended claims. For example, the control circuit controlling the switch S may be adapted by means of, for example, a coil wound in one sense, or an autotransformer instead of the transformer T1 shown and described. The switch S may also be replaced by a more extensive switching circuit comprising a plurality of transistors and diodes. It is essential for this switching circuit that the current can be passed in both directions. The limitation of the gullwing correction by means of the diodes D1 and D2 is only one of the possibilities. It is also possible to realize this limitation by means of capacitors, zener diodes and possibly an operational amplifier.

I claim:
1. A display device comprising:
   a display tube with a display screen for displaying a video signal;
   a deflection unit for deflecting at least one electron beam generated in the display tube, said deflection unit comprising at least a field deflection coil;
   means for generating at least a line deflection current and a field deflection current related to said video signal; and a field distortion correction circuit coupled to said means for generating and the deflection unit for correcting a field deflection, characterized in that the field distortion correction circuit comprises:

a resonant circuit including a series arrangement of a first inductance and a capacitor;

coupling means for coupling the resonant circuit to the field deflection coil, said coupling means applying a resonance waveform to the field deflection coil, said resonance waveform being a correction version of said field deflection current applied to said resonance circuit; and a bidirectionally conducting line frequency-controlled switch coupled across said series arrangement, said bidirectionally conducting line frequency-controlled switch having a control input coupled to said generating means for receiving said line deflection current for selectively activating said resonance circuit at the line frequency.

2. A display device as claimed in claim 1, characterized in that the coupling means comprises a second inductance magnetically coupled to the first inductance in the resonant circuit and being arranged in a path of the field deflection current.

3. A display device as claimed in claim 2, characterized in that the field distortion correction circuit includes a series arrangement of a resistor and a third inductance coupled across said resonant circuit for charging the resonant circuit, the junction point of the resistor and the third inductance being coupled to the second inductance.

4. A display device as claimed in claim 3, characterized in that the field distortion correction circuit includes at least two anti-parallel diodes arranged parallel to the resistor.

5. A display device as claimed in claim 1, characterized in that the field distortion correction circuit includes an extra resonant circuit which is arranged parallel to the series arrangement of the inductance and the capacitor.

6. A field distortion correction circuit for use in a display device as claimed in claim 1, 2, 3, 4 or 5.

* * * * *